United States Patent
Choi Tsz Hei et al.

(10) Patent No.: US 12,118,881 B1
(45) Date of Patent: Oct. 15, 2024

(54) SYSTEM AND METHOD FOR PROVIDING CONSOLIDATED EVENTS IN A TRAFFIC MANAGEMENT CONTROL CENTRE USING SITUATIONAL AWARENESS

(71) Applicant: VALERANN LTD., Tel Aviv (IL)

(72) Inventors: Kelvin Choi Tsz Hei, London (GB); Ran Katzir, London (GB); Jacob Guy Rainbow, London (GB)

(73) Assignee: VALERANN LTD, Tel Aviv (IL)

( * ) Notice: Subject to any disclaimer, the term of this patent is extended or adjusted under 35 U.S.C. 154(b) by 0 days.

(21) Appl. No.: 18/529,040

(22) Filed: Dec. 5, 2023

(51) Int. Cl.
*G08G 1/01* (2006.01)
*G06F 18/25* (2023.01)
*G06F 40/40* (2020.01)
*G06N 5/048* (2023.01)

(52) U.S. Cl.
CPC ........ *G08G 1/0141* (2013.01); *G06F 18/251* (2023.01); *G06F 40/40* (2020.01); *G06N 5/048* (2013.01); *G08G 1/0108* (2013.01); *G08G 1/0125* (2013.01)

(58) Field of Classification Search
CPC .. G08G 1/0141; G08G 1/0108; G08G 1/0125; G06F 40/40; G06F 18/251; G06N 5/048
See application file for complete search history.

(56) References Cited

U.S. PATENT DOCUMENTS

| | | | |
|---|---|---|---|
| 7,454,442 | B2 | 11/2008 | Coleigh et al. |
| 10,692,365 | B2 | 6/2020 | Ran et al. |
| 11,557,089 | B1* | 1/2023 | Choi ................. G08G 1/04 |
| 11,727,795 | B1* | 8/2023 | Shen ............ G06F 21/6254 382/105 |
| 2007/0135990 | A1 | 6/2007 | Seymour et al. |
| 2017/0040004 | A1* | 2/2017 | He .................... G09G 5/026 |
| 2018/0182238 | A1* | 6/2018 | Fowe ............... G08G 1/0112 |
| 2019/0244518 | A1 | 8/2019 | Cheng et al. |
| 2019/0311614 | A1* | 10/2019 | Yang ................ G08G 1/052 |
| 2019/0325738 | A1* | 10/2019 | Dorum .............. G08G 1/0129 |
| 2020/0234582 | A1* | 7/2020 | Mintz ........... G08G 1/096811 |
| 2021/0035449 | A1* | 2/2021 | Merfels ............ H04L 67/5651 |
| 2021/0174669 | A1* | 6/2021 | Guan .................. G06N 3/08 |
| 2021/0217307 | A1 | 7/2021 | Abdel-Aty et al. |
| 2022/0351525 | A1* | 11/2022 | Carson ............. G06V 20/58 |

(Continued)

*Primary Examiner* — Peter D Nolan
*Assistant Examiner* — Wae L Louie
(74) *Attorney, Agent, or Firm* — PEARL COHEN ZEDEK LATZER BARATZ LLP

(57) ABSTRACT

A system and method for providing consolidated events in a traffic management control centre may include: obtaining a plurality of raw events, each from an event source and each including at least one of a geographical location, timestamp and event type; validating each of the raw events against a set of rules; terminating the raw events for which validation is not successful and leaving validated events; obtaining context data from a plurality of georeferenced dynamic map layers; matching each of the validated events with the georeferenced dynamic map layers using the at least one of geographical location, timestamp and event type, and enriching each of the validated events with the associated context data to generate enriched events; matching each of the enriched events against a plurality of stored events to generate consolidated events; and providing at least one of the consolidated events to a user.

29 Claims, 5 Drawing Sheets

(56) References Cited

U.S. PATENT DOCUMENTS

| | | |
|---|---|---|
| 2023/0012934 A1 | 1/2023 | Ran et al. |
| 2023/0066501 A1* | 3/2023 | Jonietz ................. G08G 1/0112 |
| 2023/0110467 A1* | 4/2023 | Jha ................... G08G 1/096791 |
| | | 701/24 |

* cited by examiner

SYSTEM AND METHOD FOR PROVIDING CONSOLIDATED EVENTS IN A TRAFFIC MANAGEMENT CONTROL CENTRE USING SITUATIONAL AWARENESS

FIELD OF THE INVENTION

The present invention relates generally to analysis of road related data, and more specifically, to providing consolidated events in a traffic management control centre.

BACKGROUND OF THE INVENTION

Traffic management centers (TMCs) may provide infrastructure for road operators to monitor and manage traffic, intersections, and roads, and to respond to incidents and emergencies. The data landscape available to road operators in TMCs is often complex and challenging. With the rise of Internet of things (IoT) and intelligent transportation system (ITS) sensors, computer vision (AI) applications, connected vehicles, social media, weather reports and more, the volume of data that can potentially be relevant to people managing roads is only increasing over time. However, the volume of data can be overwhelming for road operators, leading to operator fatigue and errors, thus loss of situational awareness when managing road events. Alert fatigue is a significant problem that needs to be addressed to ensure the efficient operation of transport systems. Thus, technology that addresses this challenge is required in order to improve situation awareness of the road operators in real time.

SUMMARY OF THE INVENTION

A computer-based system and method for providing consolidated events in a traffic management control centre may include: obtaining a plurality of raw events, wherein each raw event of the plurality of raw events is obtained from an event source and comprises at least one of a geographical location, timestamp and event type; validating each of the raw events against a set of rules; terminating the raw events for which validation is not successful and leaving validated events; obtaining context data from a plurality of georeferenced map layers; matching each of the validated events with the georeferenced map layers using the at least one of geographical location, timestamp and event type, and enriching each of the validated events with the associated context data to generate enriched events; matching each of the enriched events against a plurality of stored events to generate consolidated events; and providing at least one of the consolidated events to a user or an application.

According to embodiments of the invention, matching each of the enriched events against a plurality of stored events may include: matching each of the enriched events against a plurality of stored events originated from the same event source and having the same event type to generate same-source-same-type fused events; matching each of the same-source-same-type fused events against a plurality of stored events originated from a plurality of other event sources and having the same event type to generate different-source-same-type fused events; and matching each of the different-source-same-type fused events against a plurality of stored events originated from the plurality of event sources and having a different event type to generate the consolidated events.

Embodiments of the invention may include: in each step of matching, associating a relevancy score to each of the validated events, enriched events, same-source-same-type fused events, different-source-same-type fused events and consolidated events, based on the matching; and providing the associated relevancy score to the user or other application together with the at least one one of the consolidated events.

According to embodiments of the invention, providing the at least one of the consolidated events to the user may include providing the consolidated events with a relevancy score that exceeds a threshold.

According to embodiments of the invention, the event source may be selected from: a road side camera, a connected vehicle, a navigation service, sensors of an intelligent transportation system (ITS), social media, weather reports and operators event, and the georeferenced map layers may be selected from: asset maps, weather maps, air temperature maps, wind speed maps, humidity maps, visibility maps, traffic maps, speed maps, flow maps, class maps, historical weekly speed maps, historical weekly flow maps, risk maps, collision maps and congestion maps.

According to embodiments of the invention, validating and matching may be performed using at least one of a binary operator and a knowledge graph, with a road-specific ontology.

According to embodiments of the invention, validating and matching may be performed using a set of fuzzy rules that comprise fuzzy operators with a road-specific ontology.

According to embodiments of the invention, the road-specific ontology may include: domains, each representing a continuous property that is related to events; input values that are continuous variables that quantify the property represented by the domain; generics that are membership functions, each defined against a domain and maps an input value into a membership value for a domain; and prepositions that are membership functions defined against a relationship between domains.

According to embodiments of the invention, the road-specific ontology further include: terms, a categorial variable representing a property that is related to an input value; and term membership functions that map first term value into a second term value or provide a confidence level.

According to embodiments of the invention, at least some of the fuzzy rules in the set of fuzzy rules may include one of time or space fuzzy prepositions.

According to embodiments of the invention, each of the fuzzy preposition may evaluate relative properties between two events or between an event and a context data item.

According to embodiments of the invention, at least one of the fuzzy prepositions may be customized to the events or the context data item.

According to embodiments of the invention, at least one of the fuzzy rules in the set of rules may be of the form IF A B C then D is E where: A is a first event, B is a fuzzy preposition, C is a second event or a context data item, wherein validating and matching comprises evaluating A B C into a truth value and applying the truth value to D is E, where: D is an outcome event and E is a generic that describes a domain in D.

Embodiments of the invention may include providing the at least one consolidated event to a machine learned natural language model to produce a narrative of the at least one consolidated event; and providing the narrative to the user.

A computer-based system and method for providing fused events in a traffic management control centre may include: obtaining a plurality of raw events, where each raw event of the plurality of raw events may include at least one of a geographical location, timestamp and event type; validating each of the raw events; terminating the raw events for which validation is not successful and leaving validated events;

matching each of the raw events against a plurality of stored events to generate fused events; and providing at least one of the fused event to a user and/or an application.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanying drawings.

Figure 1:
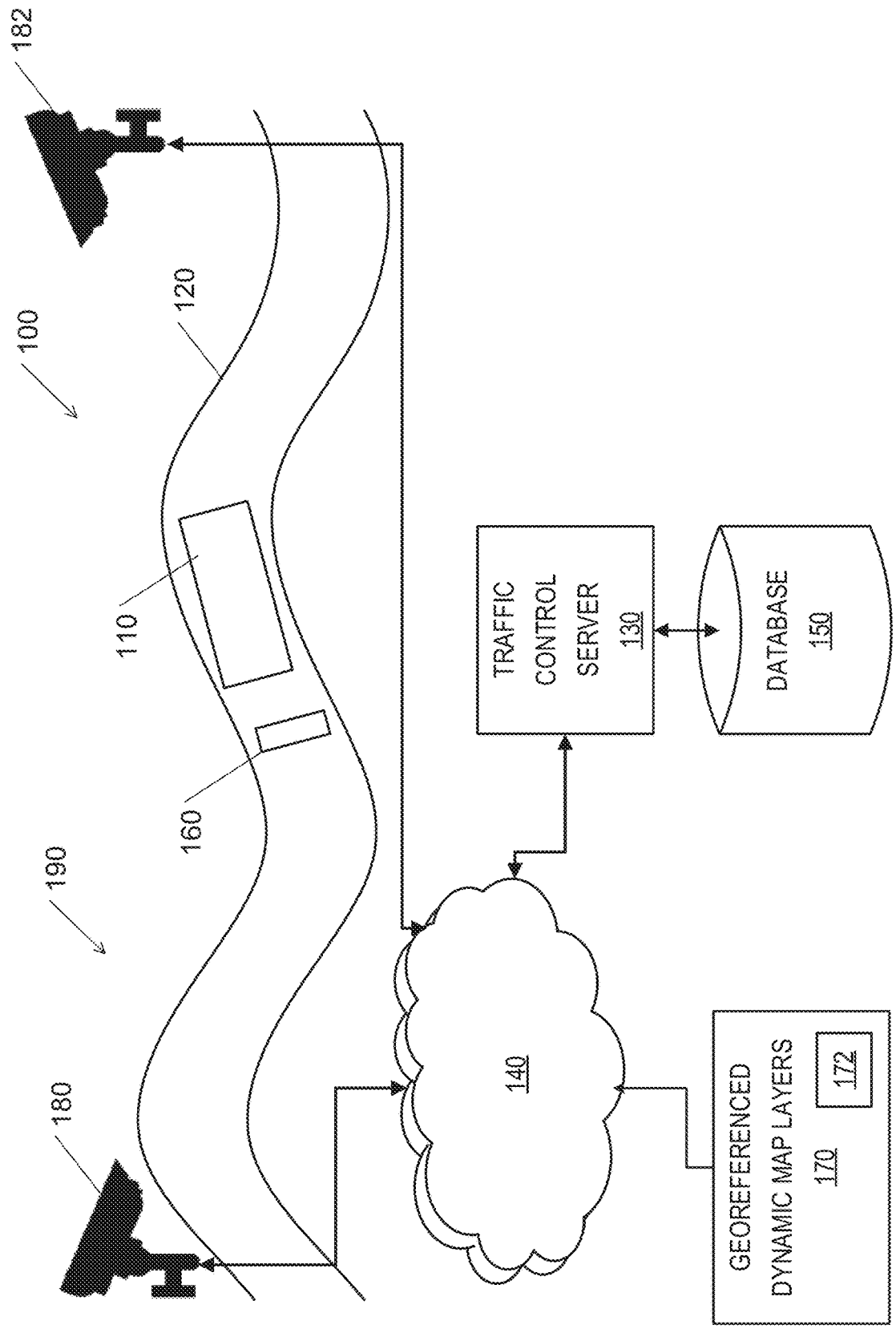
FIG. 1 depicts a system for traffic monitoring, according to some embodiments of the invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Highway control centres or TMCs are responsible for monitoring multiple systems and data sources simultaneously. These systems generate alerts that need to be addressed quickly to ensure the safety of road users. However, the volume of alerts can be overwhelming, leading to operator fatigue and errors. Alert fatigue is a significant problem that needs to be addressed to ensure the efficient operation of transport systems.

The increase in volume of data that can potentially be relevant to road operators presents a few challenges: big data may lead to information overload and alert fatigue for road operators, as it is becoming increasingly hard to separate out insight from noise. Data is often unstructured and inhomogeneous. Social media comes in natural language, phone calls are audio and vision algorithms operate in image space. Connected vehicle data is often trajectory-based and is Lagrangian, which is difficult to reconcile with legacy on-road ITS sensors. The inhomogeneity of data often adds extra work for the road operators, taking time away from actually responding to events on the road. Data is often partial and incomplete. Some data sources, such as cameras, have limited coverage in space and time. In some cases, data obtained from a single data source may be partial with relation to cause and effect relationships between events, e.g., one source may observe the cause while another sauce may observe the effect, for example one data source may observe a car crush, while another sensor may observe the congestion that is caused by the car crush. Data is noisy, especially data that is crowd-sourced, e.g., road users could be misreporting roadwork as a traffic collision, and vice versa. A traffic collision e.g., a car crush or an accident, referred to herein as a collision, may refer to an incident where a vehicle collides with another object such as another vehicle, a tree, etc.

Embodiments of the invention may provide a system and method for data analysis, data fusion and data reduction for TMCs. Embodiments of the invention may obtain raw events from a plurality of event sources that are relevant for TMCs, such as traffic cameras, connected vehicles, ITS sensors, social networks, weather reports, georeferenced map layers etc., and use a rule-based system, knowledge graphs, machine learning techniques, etc. to validate and fuse the information into a small number of meaningful consolidated events (also referred to as final or unified events). The raw events from the plurality of event sources as well as the rules used by the system, may all be provided in a near-natural language, e.g., using a road-specific ontology and taxonomy that may be similar to the natural language that a road operator may use. Thus, embodiments of the invention may improve the technology of data analysis in TMCs.

Embodiments of the invention may include layers or multi-levels of multi-source, cross-domain data fusion engines for near-real-time operational road monitoring and management. These fusion engines may be layered to provide a full situational awareness about the on-going events, conditions and context of the monitored road to improve decision-making and response time. Unlike many fusion concepts, related or unrelated to road applications, fusion may be performed using expert fuzzy rules, specially modified to fit road management-specific applications. These are natural language rules that encode the relationship amongst entities of roads using road-specific ontology. Different rules may be written by different domain experts. Additionally or alternatively, fusion may be performed knowledge graph or Boolean logic. Thus, embodiments of the invention may provide highly customizable rule-based system for data reduction for TMCs.

Embodiments of the invention may be particularly useful for transport operation centers that need to monitor multiple systems and data sources simultaneously, such as shipping ports, airports, and railway stations. By reducing the amount and improving the relevancy of data presented to the user, embodiments of the invention may improve the technologies that provide information to users, improving operator performance and safety, and enhancing the overall efficiency of the operation centre. By reducing alert fatigue, operators can respond more effectively to critical alerts, minimizing the risk of collisions and errors.

Reference is now made to FIG. 1 which depicts a system 100 for traffic monitoring, according to some embodiments of the invention. According to one embodiment of the invention, system 100 may include traffic cameras 180 and 182, connected vehicle 110, ITS sensor 160 and georeferenced dynamic map layers 170, that are connected to traffic control server 130, e.g., of a traffic control centre, over networks 140.

Traffic cameras 180 and 182 may capture images and/or video of a real-world road, way, path or route 120. Connected vehicle 110 moving along real road 120 may be captured by one or both traffic cameras 180 and 182, depending on the location of vehicle 110 with relation to the field of view (FOV) of cameras 180 and 182. Traffic cameras 180 and 182 may provide a video stream including the captured images to traffic control server 130 over networks 140. While only two traffic cameras are depicted in FIG. 1, this is for demonstration purposes only, and system 100 may support hundreds and more traffic cameras.

Each of traffic cameras 180 and 182 may be a static camera, a PTZ camera, a CCTV camera, an ANPR camera, an IP camera, a panoramic camera, a thermal camera, etc. Each of traffic cameras 180 and 182 may be positioned to capture images of road 120. Some of traffic cameras 180 and 182 may be controlled to change their FOV, e.g., using the tilt, pan and/or zoom functionalities that some of those cameras may include. Each of traffic cameras 180 and 182 may include a wired or wireless network interface for connecting to network 140. Video stream from cameras 180 and 182 may be analyzed to detect events such as hazards on the road, stopped vehicles, speeding vehicles, wrong-way driving, crashes, queues, congestion, pedestrian or animals on the road, weather and road wetness conditions, etc. The video streams from cameras 180 and 182 may be fed into a detection module (not shown) to yield the events of the various types. The detection module may be on-camera 180 and 182, at other computer nodes connected to network 140 (e.g., on the cloud) or included in server 130.

Connected vehicle 110 may be a vehicle equipped with sensors and internet connectivity. Connected vehicle 110, or the sensors in connected vehicle 110, may generate connected car data that may include real-time information such as vehicle location, speed, acceleration, fuel efficiency, engine performance, and other operational data. The connected car data generated by connected vehicle 110 may be provided to traffic control server 130 over networks 140. Connected vehicle 110 may generate events such as harsh braking, collision warning, hazard lights activated, RFID sensors door open, hazard on the road, pedestrian on the road, ABS activated, horn activated, ice on the road, pothole, wipers activated, etc.

ITS sensors 160 may be or may include, for example, a radar sensor, a LIDAR sensor, a loop sensor, acoustic sensors (e.g., in tunnels), RFID sensors (located mostly in tolls as vehicles drive by), etc. A loop sensor may include a system for vehicle detection, including inductive system for vehicle detection, typically including inductive loops laid beneath the road surface, and other sensors. Data generated by ITS sensors 160 may be provided to traffic control server 130 over networks 140. Traffic control server 130 may obtain information from other sources of data (not shown) as well, such as social networks, whether reports, crowd source, navigation applications, phone calls (e.g., emergency calls), etc. Social media sources may provide all sorts of events such as queues, crashes, weather events, hazard, stopped vehicle, etc.

Georeferenced map layers 170 or geographic dynamic (e.g., may change with time) map layers 170 may include layers in a geographic information system (GIS). A GIS may refer to a computerized dataset for capturing, storing, and displaying data related to positions on Earth's surface. A georeferenced dynamic map layer 170 may represent a map of a specific type or category of geographic data, e.g., a particular theme of data asset map, including but not limited to cartographic map, asset maps, e.g., maps showing locations of assets such as bridges, tunnels, toll booths, intersections, ramps, bus stops, signs, etc., weather maps, air temperature maps, wind speed maps, humidity maps, visibility maps, traffic maps, speed maps, flow maps, class maps, historical weekly speed maps, historical weekly flow maps, risk maps, collision maps, congestion maps, etc. The information in the georeferenced dynamic map layer 170 may be provided in the form of context data items 172 related or associated with a specific location on the map. For example, in an air temperature maps, context data items 172 may include the temperature at a certain location in a certain time, or in cartographic map a context data items 172 may include a "bridge" in a certain location. Similarly, context data items 172 may include the risk value at a certain segment of the road from an accident risk map or the traffic density at a certain segment of the road from a traffic map. Georeferenced dynamic map layers 170 and the context data items 172 may be obtained from external sources, and may change over time or be substantially static, e.g., weather maps may change several times a day, while asset maps may change may rarely change, if at all.

Context data items 172 may be different from raw events 210, 212 and 214 as context data items 172 may be continuous or quasi-continuous and may, in principle, be queried at any time and any point of the road that is covered by georeferenced map layers 170. On the other hand, raw events 210, 212 and 214 may be discrete happenings on road 120, e.g., if they happen, they happen at a specific time, and at a specific location.

Network 140 may include any type of network or combination of networks available for supporting communication between traffic cameras 180 and 182 and traffic control server 130. Network 140 may include, for example, a wired, wireless, fiber optic, cellular, satellite or any other type of connection, a local area network (LAN), a wide area network (WAN), the Internet and intranet networks, etc.

Figure 5:
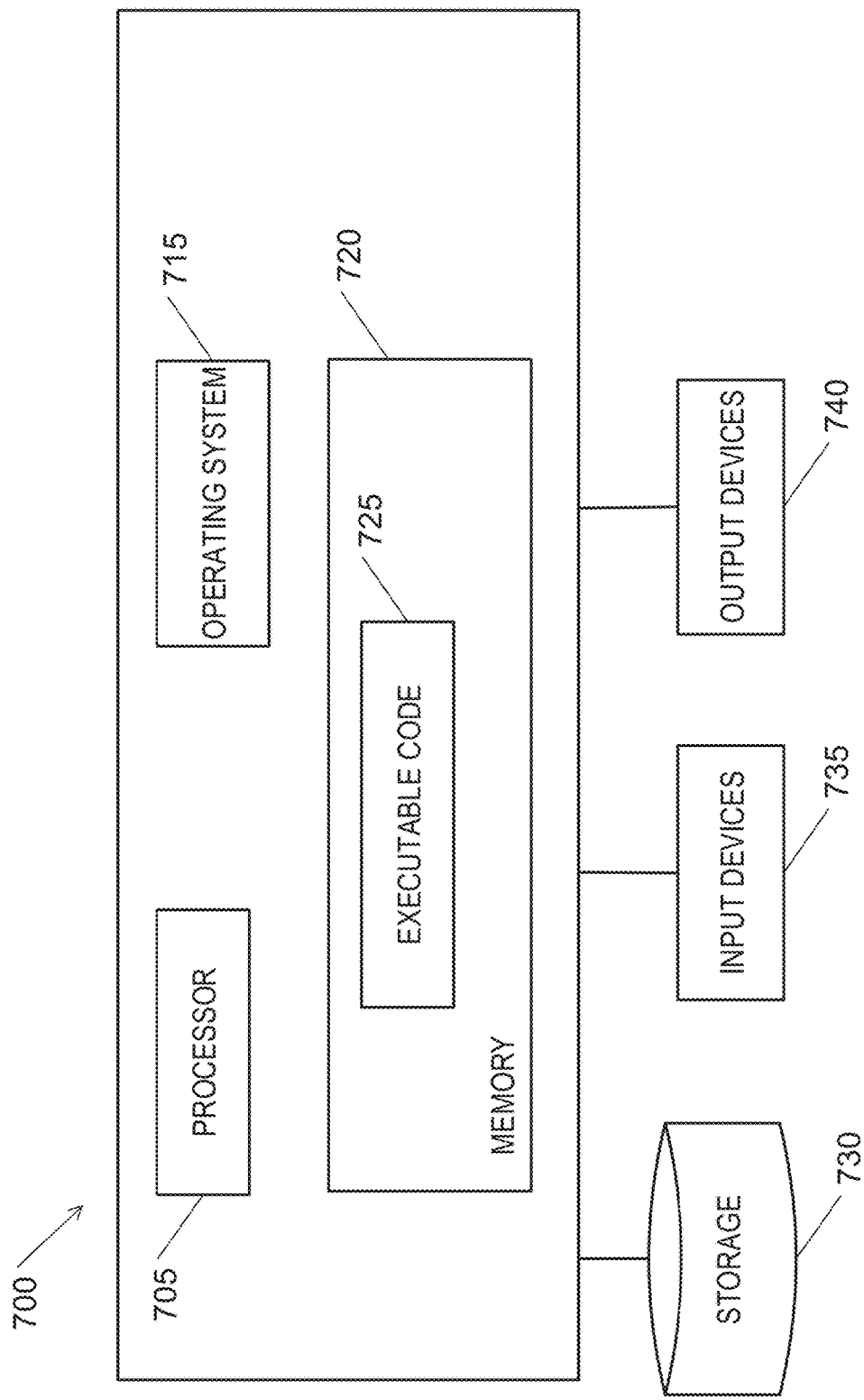
FIG. 5 shows a high-level block diagram of an exemplary computing device according to some embodiments of the present invention.

Each of traffic control server 130 and traffic cameras 180 and 182 may be or may include a computing device, such as computing device 700 depicted in FIG. 5. One or more databases 150 may be or may include a storage device, such as storage device 730. Traffic control server 130 and database 150 may communicate directly or over networks 140. In some embodiments, traffic control server 130 and database 150 may be implemented in a remote location, e.g., in a 'cloud' computing system.

According to embodiments of the invention, data from cameras 180 and 182, connected vehicles 110, IT'S sensors 160, as well as other sources such as social networks and weather reports (not shown), may be time stamped and include geographical location. The data may be analyzed by traffic control server 130 or by other computerized systems, to generate raw events, each including a geographical location, timestamp and event type.

According to some embodiments of the invention, traffic control server 130 may store in database 150 data and/or raw events obtained from traffic cameras 180 and 182, connected vehicles 110, ITS sensors 160, georeferenced dynamic map layers 170, and/or raw events generated from the obtained data, and any other data as required by the application.

As the number of cameras 180 and 182, connected vehicles 110, ITS sensors 160, together with the information provided from georeferenced dynamic map layers 170 as well as other sources such as social networks (not shown) increase, the amount of data provided to traffic control server 130 may be massive, theoretically enabling valuable insights into the behavior of drivers as well as the state of the roads, but practically making it very hard or even impossible for road operators to analyze and get valuable information from the huge amount of data.

According to some embodiments of the invention, traffic control server 130 may be configured to obtain a plurality of raw events of various types, where each raw event of the plurality of raw events may be obtained from a plurality of event sources 190 such as traffic cameras 180 and 182, connected vehicles 110 (e.g. including cameras or other sensors and connected to network 140), ITS sensors 160, social networks, weather reports, etc., and may include a geographical location, timestamp and event type; validate each of the raw events against a set of rules, terminate the raw events for which validation is not successful and leave validated events; obtain context data from a plurality of georeferenced dynamic map layers 170; match or correlate each of the validated events with the georeferenced dynamic map layers 170 using at least one of the geographical location, timestamp and event type, and enrich each of the validated events with the associated context data to generate enriched events: match each of the enriched events against a plurality of stored events to generate consolidated events; and provide at least one of the consolidated events to a user and/or to an application. According to some embodiments, traffic control server 130 may be configured to match each of the enriched events against a plurality of stored events in a multi-step process by: matching or correlating each of the enriched events against a plurality of stored events originated from the same event source and having the same event type to find events that originate from the same real world event and generate from the two matched events same-source-same-type fused events; matching each of the same-source-same-type fused events against a plurality of stored events originated from a plurality of other event sources and having the same event type to generate different-source-same-type fused events; and matching each of the different-source-same-type fused events against a plurality of stored events originated from the plurality of other event sources and having a different event type to generate the consolidated events.

Figure 2:
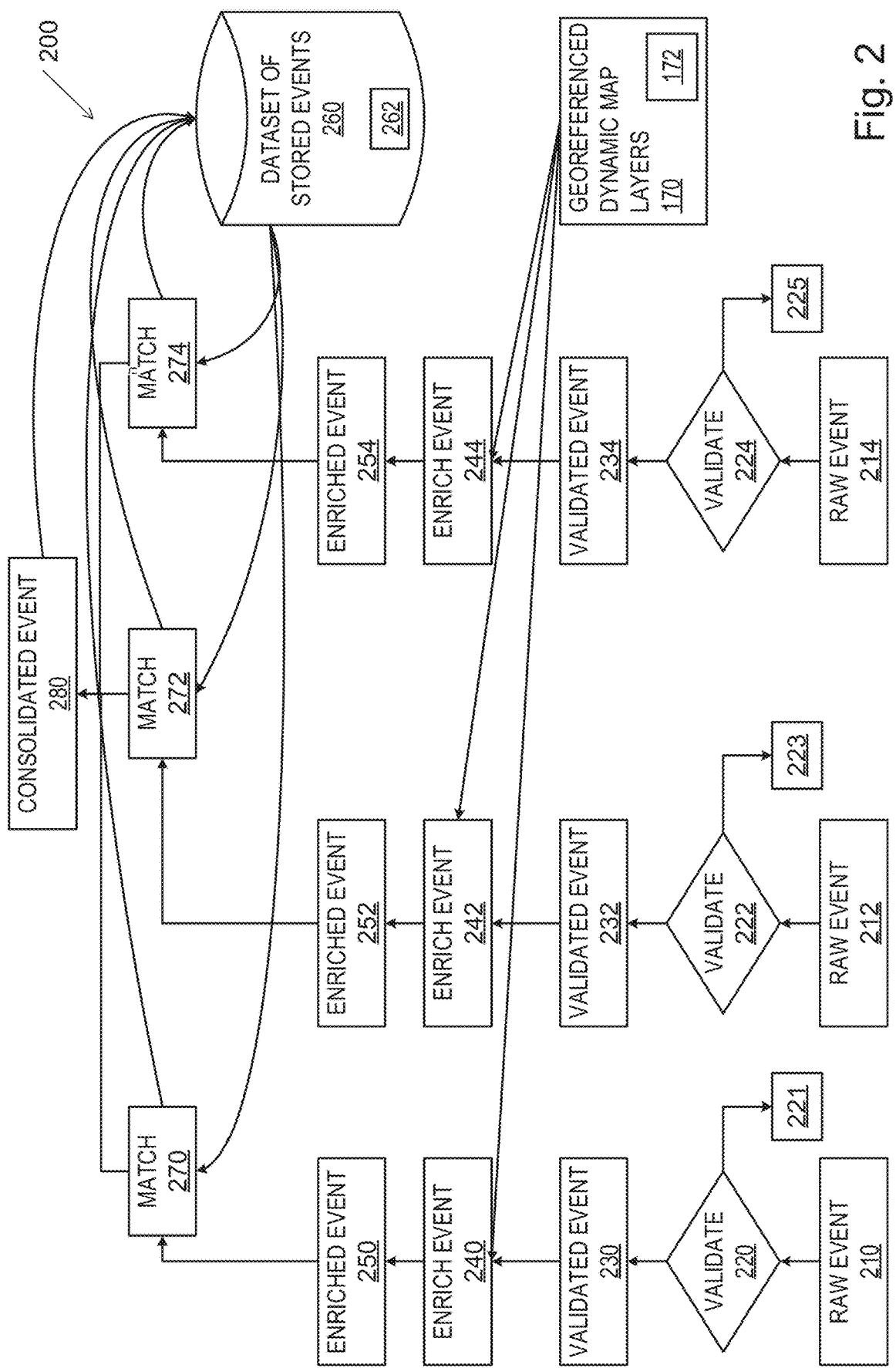
FIG. 2 depicts a system for providing consolidated events in a traffic management control centre, according to some embodiments of the invention.

Reference is now made to FIG. 2 which depicts a system 200 for providing consolidated events in a traffic management control centre, according to some embodiments of the invention. According to one embodiment of the invention, system 200 may be implemented by a processor, e.g., traffic control server 130 depicted in FIG. 1 and computing device 700 depicted in FIG. 5, or by another system.

Matching block 300 may obtain raw events 210, 212 and 214 from a plurality of event sources 190, e.g., such as traffic cameras 180 and 182, connected vehicles 110, ITS sensors 160, social networks, weather reports, and other event sources as supported by the application. Raw events 210, 212 and 214 may be generated at any point in time, by each of event sources 190, or by analyzing data provided by event sources 190. Raw events 210, 212 and 214 may include a geographical location (e.g., location coordinates such as latitude and longitude coordinates), a timestamp and an event type (e.g., stopped vehicle detection (SVD), congestion, collision, etc.). In one example, raw event 210 may be an "collision" type event generated by camera 180, with a specific location and timestamp indicating where and when the collision has been identified.

Raw events 210, 212 and 214 may be generated from sensor data in various ways, depending on the data source. Some data sources may generate unstructured raw events, e.g., data sources such as social media, connected vehicles etc. may generate unstructured raw events, while others may provide data that may have to undergo an additional layer of processing to generate events. For some data sources, processing may include turning continuous streams of information like videos into discrete events. For example, video data streams from cameras 180 and 182 may be processed, e.g., using dedicated algorithms such as object detection algorithms, to generate unstructured raw events. Another example of possible processing is turning a stream of acceleration measurements in connected vehicle 110 and generating a structured or unstructured raw event when the acceleration is above a threshold. Unstructured raw events may not need to conform to any specific schema, e.g., unstructured raw events may be provided in JavaScript object notation (JSON) format. This flexibility may allow each data source to provide unstructured raw events in a source specific format. For example, cameras 180 and 182 may use camera identification number and a bounding box to identify location; navigation applications may use latitude and longitude coordinates to define location, etc. Some unstructured raw events may only have start times, some unstructured raw events may have end times. Some unstructured raw events from social media may have textual comments, whereas others may have attached video or audio. The unstructured raw events may be turned into raw events 210, 212 and 214 by describing the unstructured raw events using the road-specific ontology, e.g., the unstructured raw events may be translated to the rad-specific ontology. The preprocessing and translation may be performed at the data source (on the edge) or at traffic control server 130. In many applications, event sources 190 are not synchronized and co-located, so raw events 210, 212 and 214 may be generated independently from one another. However, some of raw events 210, 212 and 214 that are generated by different event sources 190, may be related to one another or originated casually from the same real-world event. For example, raw events 210, 212 that are generated by the same type of event source 190, e.g., raw events generated by two different cameras 180 and 182, or raw events 210, 212 and 214 that are generated by different types of event source 190, e.g., raw events generated by camera 180, by ITS sensor 160 and by connected vehicle 110 may be related to one another or originated from the same real-world event. For example, a real-world stopped vehicle on road 120 may be represented by an "SVD" event generated by cameras 180 and 182 that monitor road 120 from different angles (or based on data provided by cameras 180 and 182), a "slowing down" event generated by connected vehicle 110 and/or ITS sensor 160 (or based on data obtained from these sensors), and by an "SVD" event and a "congestion" event in the social networks. While FIG. 2 presents three raw events 210, 212 and 214, this is done for demonstration purposes only, and the real number of typical systems 200 may be any number of raw events 210, 212 and 214 generated from any number of event sources 190.

Embodiments of the invention may fuse, merge, combine or integrate raw events 210, 212 and 214 from a plurality of a data sources and of a plurality of event types in order to provide consolidated events that are more reliable, comprehensive and accurate, and provide better understanding of the situation to a road operator. For example, a "slowing down" event generated by connected vehicle 110, obtained from a single vehicle, may, in and of itself, not present very imported information for a road operator. However, if such a "slowing down" event is combined with "slowing down" events obtained from many other connected vehicles 110 in geographical and temporal proximity to the "slowing down" event, this may add up to a more meaningful "congestion" event, and if combined with an "SVD" event obtained at about the same time from cameras 180 and 182 located at the same area, then combining this whole information together may provide a reliable and meaningful event to the road operator while also reducing noise, such as "an SVD at location X followed by congestion at road Y".

According to embodiments of the invention, each of raw events 210, 212 and 214 may be validated in validation blocks 220, 222 and 224 against a set of rules, as disclosed herein. If the validation is successful, raw events 210, 212 and 214 are validated 230, 232 and 234, e.g., considered as real events or events that actually happened in the real world. Validation is successful if a raw event 210, 212 and 214 is evaluated against a set of rules and the validation result is that the raw event is valid (e.g., confidence is high). If, however, the validation is not successful, it may be assumed that the unvalidated event is not a real event, e.g., it never happened in the real world. Raw events 210, 212 and 214 that are not successfully validated may be terminated 221, 223, 225 and discarded. Terminated events 221, 223, 225 are considered invalid or not real and do not take part in further processing steps. Validation is unsuccessful if a raw event 210, 212 and 214 is evaluated against the set of rules and the validation result is that the raw event is invalid (e.g., confidence is low). Another case of unsuccessful validation may be that validation blocks 220, 222 and 224 are unable to validate a raw event 210, 212 and 214 against the set rules. The last case is important because some raw events 210, 212 and 214 may be missing important information like location and time and therefore cannot be evaluated against the set rules; or some raw events 210, 212 and 214 may be of types that cannot be mapped to the road-specific ontology (terms) e.g., an event type of "banana on the road" may not be defined as part of the road specific ontology and therefore cannot be evaluated; or some raw events 210, 212 and 214 may include values that are beyond the allowed range of the domain and therefore cannot be evaluated, e.g., temperature that is 100 degrees Celsius, but the temperature domain is only defined between −10 to 40 degrees Celsius, etc. For all those cases, validation is considered not successful.

After validations, validated events 230, 232 and 234 may be enriched 240, 242 and 244 with context data items 172 included in the georeferenced dynamic map layers 170 to generate enriched events 250, 252, and 254. Enriching 240, 242 and 244 may include adding information from context data items 172 into validated events 230, 232 and 234, to generate or create enriched events 250, 252, and 254. For example, validated events 230, 232 and 234 may be matched or correlated with the georeferenced dynamic map layers using at least one of the geographical location, timestamp and event type, and a context data item 172 from georeferenced dynamic map layers 170 may be selected for enriching a validated event 230, 232 and 234 based on matching, e.g., context data item 172 from the location and time of a validated event 230, 232 and 234 may be selected to enrich that validated event. After matching with the georeferenced dynamic map layers 170 and selecting the context data items 172, the validated events 230, 232 and 234 may be enriched with information from the selected context data items 172 to generate enriched events 250, 252, and 254.

Enriched events 250, 252, and 254 may be matched by matching blocks 270, 272 and 274 against a plurality of stored events 262 to generate consolidated events 280. Matching 270, 272 and 274 may be performed using a set of rules, as disclosed herein. As used herein, matched or correlated events may refer to events that originate or relate to the same real-world event, e.g., the exact same real-world event e.g., a collision, or real-world events that have a cause-and-effect relationship between them, e.g., a car crash and congestion caused by the car crash). It may be assumed that different events (e.g., raw events 210, 212 and 214, validated events 230, 232 and 234, enriched 240, 242 and 244 and other events disclosed herein) that originate or relate to the same real-world event may have some relation between them, either temporal (e.g., events happening at about the same time), spatial (e.g., events happening at about the same location) and/or causal (e.g., interrelated events or events that are related by cause and effect.) relation that may indicate that the events originate or relate to the same real-world event. System 200 may use rules (Boolean, fuzzy or other) e.g., in matching blocks 270, 272 and 274, to discover the temporal, spatial and causal relations between events to determine if separate events match, e.g., originate or relate to the same real-world event or not.

For example, a "collisions" event provided from camera 180, a "collisions" event provided from camera 182, and a "collisions" event provided from a social network, may all match if all relate to the same real-world collisions. A "congestion" event originated from a connected vehicle 110 may also match the same "collisions" event if the congestion is a result of the same real-world collisions.

If an enriched event, e.g., enriched event 250, cannot be matched with any of the stored events 262, the enriched event is stored as a stored event 262 in the dataset of stored events 260. If an enriched event, e.g., enriched event 250, is matched with one or more of the stored events 262, then the matched enriched event 250 and stored events 262 may be fused, combined or unified to generate a consolidated event 280, including a combination of data from enriched event 250 and the matched stored events 262. Matching blocks 270, 272 and 274 may further calculate a relevancy score for the consolidated event 280. The consolidated event 280 (including the relevancy score) may be provided to the user and stored as a stored event 262 in the dataset of stored events 260. While FIG. 2 presents a single consolidated event 280, this is an example only and the system may generate more than one consolidated events 280, depending on the analyzed events.

Consolidated events 280 may be provided to a user, e.g., to a road operator and/or to an application, e.g., another road management application. In some embodiments, consolidated events 280 may be provided to a user using a graphical user interface (GUI) that may display the list of consolidated events 280. Consolidated events 280 may be contextualised against georeferenced dynamic map layers 170, e.g., traffic, weather, risks, and displayed on a map. The GUI may further enable presenting the reasoning paths, e.g., the results of validation blocks 220, 222 and 224, enrichment blocks 240, 242 and 244 and matching blocks 270, 272 and 274, presenting raw events leading to consolidated events 280, etc. According to some embodiments, a consolidated event 280 may be provided to a machine learned natural language model, e.g., such a ChatGPT® model to produce a narrative, e.g., a story or a written description in natural language of the at least one consolidated event, and the narrative may be provided to the user. Examples for consolidated events 280 may include:

an accident event at a location at a time, involved an SVD and congestion events from multiple data sources.

an SVD from camera, enriched and validated from the traffic map, indicated whether the stopped vehicle has affected the traffic flow.

According to some embodiments, stored events 262 may be removed, deleted or terminated from the dataset of stored events 260 when certain conditions are met. For example, a stored event 262 may be deleted from the dataset of stored events 260 when a human operator of system 200 marks the stored event 262 for deletion or indicates that stored event 262 is no longer relevant. Additionally or alternatively, a stored event 262 may be deleted from the dataset of stored events 260 automatically, for example, if the stored event 262 is not updated for a predetermined time and/or, if the stored event 262 is not matched to any other event for a predetermined time. In some embodiments, the predetermined time after which a stored event 262 is deleted may depend on the event type. For example, an SVD event may be automatically deleted after several hours with no updates or matches, e.g., 2, 3, 5 hours, etc., whereas as "car crash" event may be automatically deleted after longer periods with no updates or matches, e.g., 12, 24, 36 hours, etc. Additionally or alternatively, a stored event 262 may be deleted from the dataset of stored events 260 if other events that were fused with stored event 262 no longer exist, e.g., if events that were fused with stored event 262 still exist stored event 262 may be saved, and if events that were fused with stored event 262 no longer exist, stored event 262 may be removed.

Rules for validating raw events 210, 212 and 214, for matching validated events 230, 232 and 234 with georeferenced dynamic map layers 170 and for matching each enriched events 250, 252, and 254 against a plurality of stored events 262, may include Boolean operators, a knowledge graph, and/or a set of fuzzy rules that comprise fuzzy operators, or other elements. The events, including raw events 210, 212 and 214, validated events 230, 232, and 234, enriched events 250, 252, and 254, consolidated events 280 and stored events 262, context data items 172 from georeferenced dynamic map layer 170, and rules, including the binary operators, knowledge graphs, and fuzzy rules may be expressed and implemented using road-specific ontology.

The Boolean operators may be included in rules, where each of those rules may give a binary YES/NO answer (e.g., no indicating not validated: yes indicating validated). Examples of rules that include Boolean operators may be:

if the event duration is less than 5 minutes, then it is not relevant (e.g., not validated).

if a collision is within 200 meter of a congestion, then they are related (e.g. validated).

In a knowledge graph the rule may be encoded in a weighted, directed graph. In this context, a knowledge graph may be a graphical representation of knowledge where entities may be represented as nodes and relationships between them may be represented as edges. Nodes in the knowledge graph may represent entities, concepts, or variables relevant to the decision-making process. These nodes may represent various aspects of the problem domain, such as events, conditions, actions, or outcomes. Edges in the knowledge graph may represent the relationships or rules that connect the nodes. These relationships may be directed, indicating the direction of influence or causality. Edges may also be weighted to indicate the strength or importance of the relationship. Each edge in the knowledge graph may encode a specific rule or relationship between nodes. These rules may represent causal relationships, dependencies, or conditions that may affect the decision-making process. For example, if an event A is connected to an event B with an edge labeled "causes," it implies that event A can cause event B.

Example Nodes may include:

Traffic Events: This node may represent various types of traffic events, such as car crashes, road closures, congestion, etc.

Decision Actions: This node may represent the actions that can be taken, such as fusion, drop, create new event, etc.

Example Edges may include:

Causes: An edge labeled "Causes" may connect traffic events to traffic flow. For example, there may be an edge from "collision" to "congested traffic flow," indicating that collisions can cause traffic congestion.

Depends on: An edge labeled "Depends On" may connect traffic flow to decision actions. For example, there may be an edge from "congested traffic flow" to "dispatch emergency services," indicating that dispatching emergency services depends on traffic congestion.

The fuzzy rules may be written in a near-natural language using the road-specific ontology. For example, the road-specific ontology may include:

Domains, each representing a property, provided as a continuous variable, that is related to events. Domains may include temperature, distance, time, risk etc.

Input values that may be continuous variables that quantify the property represented by the domain. The continuous variables may have units, a minimum value and a maximum value. Input values may be mapped to pre-defined domains in the ontology. For example, a measurement of 13 degrees Celsius from a road side unit may be mapped to the Temperature domain, which has unit C and a range of −10 to 10 (a temperature reading above or below the range will be snapped to the maximum or minimum of the range, respectively). Temperature measurements of 14 degrees Fahrenheit from a weather product may be mapped to this same domain as well.

Generics (noun) that are membership functions, each defined against a domain and maps an input value into a membership value for a domain. Generics may include levels like low, medium, high that are defined against a domain. These labels may be flexible and defined and customized to best suit the road operator's way of describing their roads. For example, 'cold' in a tropical road may have a different range than 'cold' in an arctic road. These fuzzy membership functions may map any input value for a domain into a membership value between 0 and 1. For instance, 15 degrees may be mapped to a membership value of 0.7 in cold in the domain of temperature; the time 19:00 may have a membership value of 0.5 in the nighttime.

Prepositions that are membership functions defined against a relationship between domains. A preposition may be a special type of generic that may be defined on the relationship between two domains; whereas regular generics are defined on the property of an object. This is motivated by the need for relative geospatial reasoning in the fuzzy rules for road applications. For example, a new preposition 'near' may be defined on the domain distance. Then, when a rule includes "A near B", the rule refers to how near A is to B. Additionally, multiple versions of 'near' may be defined, each dependent on what A and B are. For example, "The car is near Tel Aviv" vs "The car is near the tunnel" requires different definitions of near that encapsulate the context. The different variations of 'near' may be encoded within the near preposition as part of the road-specific ontology. Similarly, different variations of other prepositions may be encoded within each preposition as part of the road-specific ontology. In some implementations, the location information of A and B may be provided in different coordinate systems, but the near preposition may know how to find a common ground for the operation. Prepositions may be applied to other domains, e.g., to the temporal domain where "A near B" may also mean the times of A is near the times of B.

Terms that are a categorial variable representing a property that is related to an input value. Traditional fuzzy logic works well for continuous variables like temperature and distance. However, a lot of logic in the road space is categorical in nature e.g., vehicle classification, asset types, incident types, etc. embodiments of the invention may expand the concept of fuzzy logic into categorical terms. According to some embodiments, terms may be similar to domains, only for categories such as incident type, source type, vehicle classification, etc.

term membership functions that map first term value into a second term value. Terms may be related to other terms with a membership function. For example, a car is 100% a vehicle. A pedestrian-on-road event type is 100% a pedestrian and also 100% an event. A stopped vehicle is 100% a vehicle, but only 50% a collision. In some embodiments, the term membership function may equal or be related to the term belief. The term belief may provide a confidence level to the term and by this may capture the fuzzy nature of the term. The term belief may be tied to a quantification of uncertainty obtained from the data source, e.g., a confidence level of the term. For example, a "pedestrian on road" event derived from camera 180 may have a term "pedestrian on road" with a belief taken from the object detection confidence level, and a "collision" event derived from a navigation application may have its belief based on the number of thumbs up.

According to some embodiments, at least some of or a portion of the fuzzy rules in the set of fuzzy rules may include time or space fuzzy prepositions, where each of the fuzzy prepositions may evaluate relative properties between two events or between an event and a context data item 172. For example, the proposition "near(distance)" may define a distance between properties and "near(time)" may define a time difference between properties. Some prepositions may be customized to the events or the context data item. For example, "near(distance)" related to a bridge may have other categories compared with "near(distance)" related to a town.

such as "is" or "near". Depending on what the verb is, different properties of A and C will be accessed, e.g., if B is "near" then either the location or time properties are reasoned Events, e.g., any one of raw events 210, 212 and 214, validated events 230, 232 and 234, enriched events 250, 252, and 254, stored events 262, consolidated events 280 as well as context data items 172 from georeferenced dynamic map layer 170, may be objects that can be reasoned with. The events may include as metadata:

Location (any coordinate system—LRS or WGS).

Time.

Any properties, defined in domains or terms.

For example, an event may include→e(type=SVD, temperature=cold, location=3 miles south, time=3 am), a toll object may be an event→e(type=toll, location=4 miles north). The events may be set up so that rules written against them may reason about their location, time and other properties. For example, when a rule includes the preposition 'near' (location) the processor evaluating the rule knows to access the location information in the event structure.

According to embodiments of the invention, one type of fuzzy rules in the set of rules may be of the form IF A B C then D is E where:

A may be a first event, typically with properties such as location, time, speed, type etc.

B may be a fuzzy preposition, such as "is" or "near". Depending on what the verb is, different properties of A and C will be accessed, e.g., if B is "near" then either the location or time properties are reasoned.

In one variation of this rule C may be a second event, a generic or a context data item 172, again with properties such as location, time, speed, type etc. In another variation, C may be a generic that describes a domain in A e.g., "fast", "slow".

D is an outcome event and E is a generic that describes a domain in D, e.g., "fusion is likely", or "risk is high".

Validating and matching using this type of rule may include evaluating A B C into a truth value and applying the truth value to D is E. Examples may include:

If event is near a tunnel, then risk is high.

If SVD duration is long, then event is visible.

If congestion is near the toll and it is short, then event has low relevance.

According to some embodiments, a plurality of rules may be evaluated in any step of validating, matching and enriching. For example:

IF A B C then D is E

IF F G H then D is I

IF J K L then Dis M

After the evaluation of the three rules above, D is E will have a truth value of (A B C), D is I will have a truth value of (F G H), D is M will have a truth value of (J K L). A strategy may be required to combine these conclusions. Typical strategy known in the art is Mandini Max Min, where the fuzzy functions E, I and M are weighted by the truth value, then unified and then the centre of gravity is found.

As noted, each of raw events 210, 212 and 214 may be validated 220, 222 and 224 against a set of rules. Examples for validation rules may include the following examples. In the examples below, event may refer to one of raw events 210, 212 and 214:

When event is at night and event is from camera then confidence is low (e.g., event not validated and terminated)
  When event is fog and report_rating is low then confidence is low (e.g., event not validated and terminated)
  When event is waze and number_of_thumbs_up is high then confidence is high ((e.g., event successfully validated)
  When event is congestion and event is high speed then confidence is low (e.g., event not validated and terminated)
  When event is congestion and event has long jam_length then confidence is high
  Combined with:
  When event is low confidence then event is low validity (e.g., event not validated and terminated)
  When event is in the past then event has low validity (e.g., event not validated and terminated)
  When event is not near the road then event has low validity (e.g., event not validated and terminated)
  In these rules:
  Fog, at night, waze, camera and congestion are terms.
  Validity, confidence, number_of_thumps_up, report rating, speed and jam_length are domain.
  Low and high are generic (note: low, when used against each domain, may have different meanings).

Examples for matching or fusion rules may include the following. In the examples below, event may refer to any one of validated events 230, 232 and 234, enriched events 250, 252, and 254, same-source-same-type fused events 312 and different-source-same-type fused events 314, and stored event refers to stored events 262:

When event is near (distance) stored event and event is near(duration) stored event then fusion is likely (e.g., event and stored event match and are unified)
  When event camera_id is stored event camera_id then fusion is definitely (e.g., event camera_id is validated)
  When event is a truck and event is an SVD and stored event is a roadwork then output is a roadwork (e.g., event truck, event SVD and stored event roadwork match and are unified to an event roadwork)
  When event is SVD and stored event is SVD and event is near the toll_booth and traffic is slow then output is congestion (e.g., event SVD, stored event SVD and traffic is slow match and are unified to an event congestion)
  In these rules:
  distance, duration and fusion are domain.
  Near is a preposition (defined for difference in distance and difference in duration)
  Likely, definitely and slow are generics.
  Truck, SVD, roadwork are all terms Reference is now made to FIG. 3 which depicts a schematic illustration of matching block 300 for providing consolidated events in a traffic management control centre, according to some embodiments of the invention. According to one embodiment of the invention, matching block 300 may be implemented by a processor, e.g., traffic control server 130 depicted in FIG. 1 and computing device 700 depicted in FIG. 5, or by another system.

Figure 3:
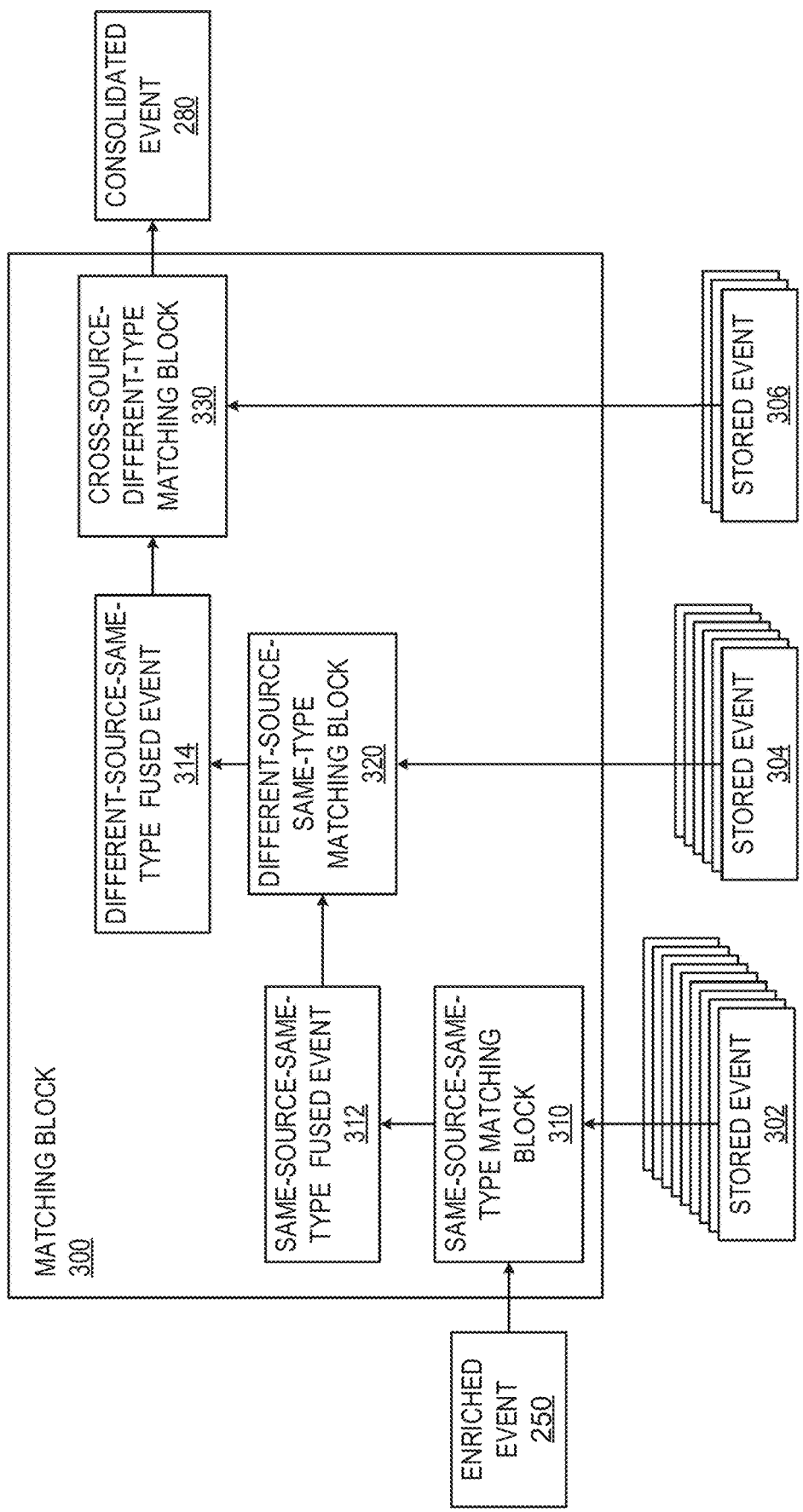
FIG. 3 depicts a schematic illustration of a matching block for providing consolidated events in a traffic management control centre, according to some embodiments of the invention.

Matching block 300 may be equivalent to any one of matching blocks 270, 272 and 274. Matching block 300 may include a hierarchical structure of matching blocks 310, 320 and 330 used for matching enriched events 250, 252, and 254 with stored events 262. Each of matching blocks 310, 320 and 330 may include a set of rules for matching an input event with a stored event 262. It is noted that while FIG. 3 presents an exemplary implementation of matching blocks 270, 272, 274, other implantations and other hierarchies may be used.

Same-source-same-type matching block 310 may obtain as input an enriched event, e.g., enriched event 250, and one or more stored events 302, where stored events 302 originate from the same event source as enriched event 250 and have the same event type. Matching block 310 may match enriched event 250, and one or more stored events 302 using a set of rules to generate same-source-same-type fused events 312. For example, if enriched event 250 is an "SVD" event type generated by camera 180, same-source-same-type matching block 310 may match enriched event 250 with other "SVD" events that were generated by other cameras, e.g., camera 182, to determine if both event match, e.g., refer to the same real-world event, in this case, to the same stopped vehicle captured by different cameras. If enriched event 250, and a stored event 302 match, enriched event 250 and the matched stored event 302 may be fused or unified to generate a same-source-same-type fused event 312, that may include information from both the enriched event 250 and the matched stored event 302. The same-source-same-type fused event 312 may be stored in the dataset of stored events 260. It is noted that system 200 may include a plurality of same-source-same-type matching blocks 310, e.g., a same-source-same-type matching block 310 for each combination of event source and event type, e.g., a first same-source-same-type matching block 310 for "SVD" type events originated from cameras, a second same-source-same-type matching block 310 for "car crush" type events originated from cameras, a third same-source-same-type matching block 310 for "SVD" type events originated from connected vehicles, etc., so that each supported combination of event source and event type would have a dedicated same-source-same-type matching block 310 with rules that are designed to analyse that specific combination of event source and event type. For example, a rule in same-source-same-type matching block 310 may be in the form of:

if enriched event near(space) stored event and enriched event near(duration) stored event then fuse events.

Different-source-same-type matching block 320 may obtain as input the same-source-same-type fused event 312 and one or more stored events 304, where stored events 304 are originated from other types of event sources and have the same event type. In some embodiments, stored events 304 may be same-source-same-type fused events 312 generated by fusing events of other types of event sources and stored in the dataset of stored events 260, e.g., by other instances of same-source-same-type matching block 310. Different-source-same-type matching block 320 may match the same-source-same-type fused event 312 and each of the one or more stored events 304, using a set of rules to generate different-source-same-type fused event 314. For example, if the same-source-same-type fused event 312 is an "SVD" event type generated by fusing the "SVD" events from cameras 180 and 182, and stored event 304 is an "SVD" event generated by fusing "SVD" events obtained from a plurality of connected vehicle 110, matching block 320 may match the same-source-same-type fused event 312 with the other "SVD" events to determine if both events match, e.g., refer to the same real-world event, in this case, to the same stopped vehicle captured by different cameras and reported by connected vehicles 110. If the same-source-same-type fused event 312 and a stored event 304 match, the same-source-same-type fused event 312 and the stored event 304 may be fused or unified to generate a different-source-same-type fused event 314, that includes information from both the same-source-same-type fused event 312 and the matched stored event 304. The different-source-same-type fused event 314 may be stored in the dataset of stored events 260. It is noted that system 200 may include a plurality of different-source-same-type matching blocks 320, e.g., a different-source-same-type matching block 320 for each combination of two or more event sources and a single event type, e.g., a different-source-same-type matching block 320 for "SVD" type events originated from cameras 180 and 182 and connected vehicles 110, a second different-source-same-type matching block 320 for "car crush" type events originated from cameras 180 and 182 and connected vehicles 110, a third same-source-same-type matching block 310 for "SVD" type events originated from connected vehicles 110 and ITS sensors 160, etc., so that each supported combination of each combination of two or more event sources and a single event type would have a dedicated different-source-same-type matching block 320 with rules that are designed to analyse that specific combination of event sources and event type. For example, a rule in Different-source-same-type matching block 320 may be in the form of:
- if same-source-same-type event is of type "SVD" and source "camera" and stored event is of type "SVD" and source "navigation application" then fusion is likely.
- if same-source-same-type event is of type "crash" source "camera" and stored event is of type "crash" and source "navigation application" then fusion is likely.

Cross-source-different-type matching block 330 may obtain or receive as input the different-source-same-type fused event 314 and one or more stored events 306, where stored events 306 are originated from the same or other types of event sources and pertain to other event types. In some embodiments, stored events 306 may be different-source-same-type fused event 314 generated by fusing events of the same or other types of event sources and other types of event types stored in the dataset of stored events 260, e.g., by other instances of different-source-same-type matching block 320. Cross-source-different-type matching block 330 may match the different-source-same-type fused event 314 and each of the one or more stored events 306, using a set of rules to generate consolidated event 280. For example, if the different-source-same-type fused event 314 is an "SVD" event type generated by fusing the "SVD" events from cameras 180 and 182 and from connected vehicles 110, and stored event 306 is a "congestion" event obtained by matching "congestion" event types obtained from various event sources, cross-source-different-type matching block 330 may match the different-source-same-type fused event 314 with all types of events that were generated by the same or other types of event sources, e.g., cameras 180 and 182, connected vehicles 110, social media, ITS sensors, etc., to determine if both event match, e.g., refer to the same real-world event, in this case, a congestion caused by the stopped vehicle captured by the different cameras and reported by connected vehicles 110. If the different-source-same-type fused event 314 and a stored event 306 match, the different-source-same-type fused event 314 and the stored event 306 may be fused or unified to generate consolidated event 280, that may include information from both the different-source-same-type fused event 314 and the matched stored event 306. For example, a rule in cross-source-different-type matching block 330 may be in the form of:
- if different-source-same-type fused event is of type "congestion" and stored event is of type "crush" and different-source-same-type fused event is after(distance) stored event then fusion is likely.
- if different-source-same-type fused event is of type "congestion" and stored event is of type "crush" and different-source-same-type fused event is before(distance) stored event then fusion is unlikely.

Any one of matching blocks 310, 320 and 330 may assign a relevancy score to the fused event. The relevancy score, referred to as relevance, may be a domain. For example, Relevance may be low, medium, high etc. Relevance may be determined by matching blocks 310, 320 and 330 using dedicated rules. For example, relevance rules in cross-source-different-type matching block 330 may include:
- when data source is many, then relevance is high.
- when it is accident and pedestrian on road is many, then relevance is high.
- when event is SVD and it is nighttime and wind is strong then relevance is high.
- when a pedestrian on a road is near a bridge then relevance is high (this rule may provide a warning for a possibility of people committing suicide on the bridge).

While other implementations of matching blocks 270, 272 and 274 are possible, for example a flat matching block in which all raw events 210, 212 and 214 may be matched to all stored events 262 with no hierarchy, the hierarchical implementation of FIG. 3 may provide significant advantages, both in terms of system design and in terms of computational efficiency at runtime.

Same-source-same-type matching block 310 may include, inter alia, source specific rules. For example, same-source-same-type matching block 310 that match enriched event 250 and one or more stored events 302 that originate from a camera 180, may include rules that are specific to events that are originated from a camera, while same-source-same-type matching block 310 that match enriched event 250 and one or more stored events 302 that originate from a LIDAR sensor, may include rules that are specific to events that are originated from a LiDAR sensor. Different-source-same-type matching block 320 may include, inter alia, event type specific rules. For example, different-source-same-type matching block 320 that match a same-source-same-type fused event 312 and one or more stored events 302 that originate from an SVD event type, may include rules that are specific to SVD events, while different-source-same-type matching block 320 that match a same-source-same-type fused event 312 and one or more stored events 302 that originate from a 'man on the road' event type, may include rules that are specific to 'man on the road' events. Similarly, cross-source-different-type matching block 330 may include, inter alia, more complex rules that require road understanding. For example, cross-source-different-type matching block 330 that match a different-source-same-type fused event 314 of one type and one or more stored events 302 of a different type may include rules that evaluate to the relation between the two types of events. Thus, designing each one of those matching blocks 310, 320 and 330 may require different expertise, and may be done by different field specific experts. In addition, dividing the matching operations to three distinct levels as disclosed herein with relation to FIG. 3, may simplify each of the matching blocks. During runtime, the hierarchical structure may require less computational power compared with the flat design, since there will be less events in the higher hierarchical levels and therefore less computations will be required.

Figure 4:
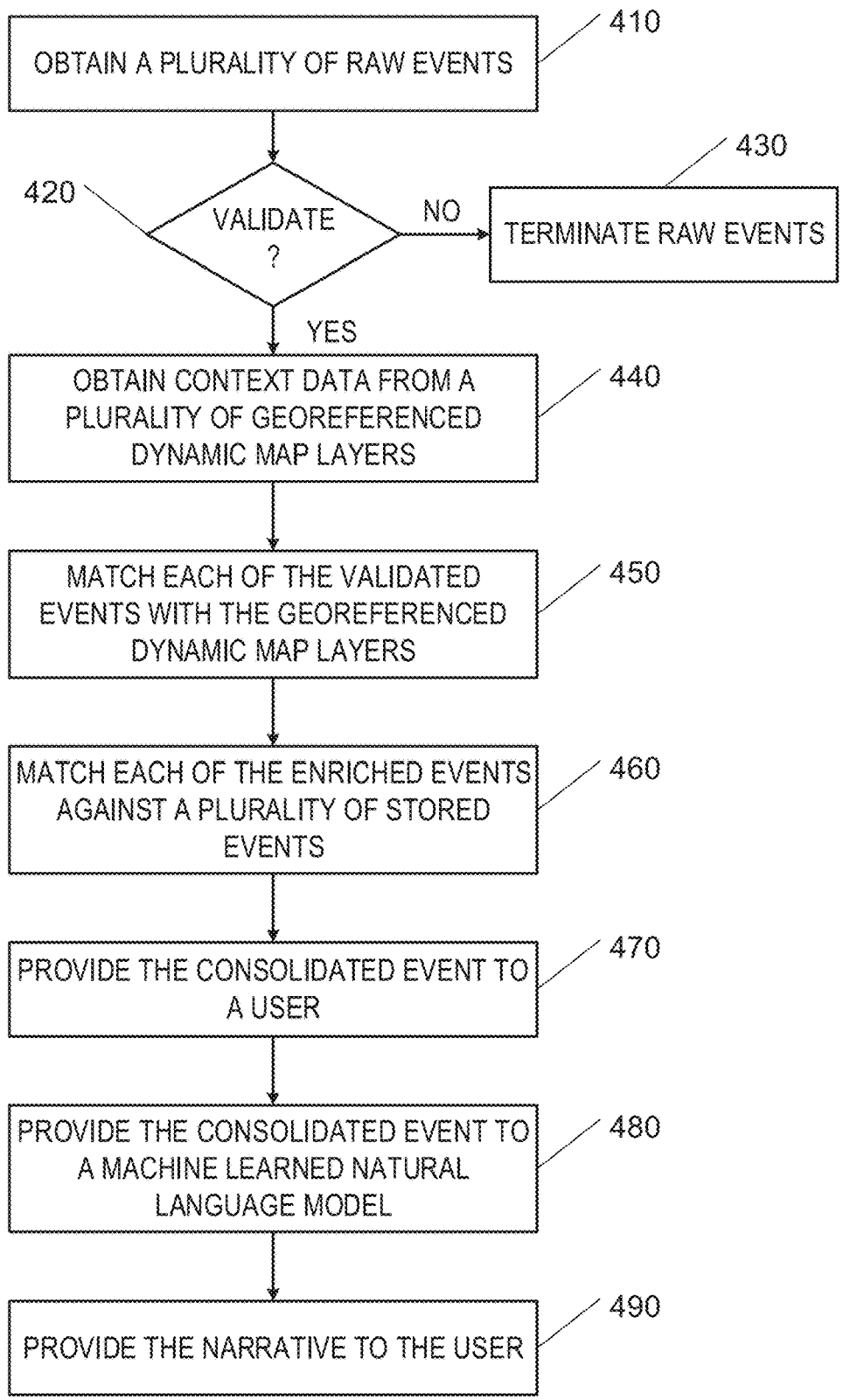
FIG. 4 shows a flowchart of a method for providing consolidated events in a traffic management control centre, according to some embodiments of the present invention.

Reference is now made to FIG. 4, which is a flowchart of a method for providing consolidated events in a traffic management control centre, according to embodiments of the invention. While in some embodiments the operations of FIG. 4 are carried out using systems as shown in FIGS. 1-3, in other embodiments other systems and equipment can be used.

In operation 410, a processor (e.g., processor 705 depicted in FIG. 5) may obtain or receive a plurality of raw events, where each raw event of the plurality of raw events may obtained from an event source and may include at least one of a geographical location, timestamp and event type. The event source may be, for example, a roadside camera, a connected vehicle, a navigation service, sensors of an ITS, social media, weather reports, operators event, etc. In operation 420, the processor may validate each of the raw events against a set of rules, where the rules may include one of binary operators, knowledge graphs, and fuzzy rules, with a road-specific ontology. The result of the validation may be either validation successful or validation not successful. In operation 430, e.g., if validation is not successful, the processor may terminate the raw events for which validation is not successful. In operation 440, e.g., if validation is successful, the processor may obtain context data from a plurality of georeferenced dynamic map layers. The georeferenced dynamic map layers may be, for example, asset maps, weather maps, air temperature maps, wind speed maps, humidity maps, visibility maps, traffic maps, speed maps, flow maps, class maps, historical weekly speed maps, historical weekly flow maps, risk maps, collision maps, congestion maps, etc.

In operation 450, the processor may match or correlate each of the validated events with the georeferenced dynamic map layers using the at least one of geographical location, timestamp and event type, and enrich each of the validated events with the associated context data to generate enriched events. In operation 460, the processor may match each of the enriched events against a plurality of stored events to generate consolidated events. In some embodiments, matching each of the enriched events against a plurality of stored events may include: matching each of the enriched events against a plurality of stored events originated from the same event source and having the same event type and unify or combine the two matched events to generate same-source-same-type fused events, matching each of the same-source-same-type fused events against a plurality of stored events originated from a plurality of other event sources and having the same event type to generate different-source-same-type fused events, and matching each of the different-source-same-type fused events against a plurality of stored events originated from the plurality of event sources and having a different event type to generate the consolidated events. In some embodiments, in each step of matching, the processor may associate a relevancy score to each of the validated events, enriched events, same-source-same-type fused events, different-source-same-type fused events and consolidated events, based on the matching.

In operation 470, the processor may provide or present at least one of the consolidated events to a user, e.g., on a computer display using a graphical user interface (GUI). and/or to an application. In some embodiments, the associated relevancy score may be presented or provided to the user and/or to the application together with the at least one of the consolidated events. In some embodiments, the processor may provide or present to the user the consolidated events with a relevancy score that exceeds a threshold or the consolidated event with the highest relevancy score.

According to embodiments of the invention, the processor may validate and match using at least one of a binary operator and a knowledge graph, a set of fuzzy rules that comprise fuzzy operators, with a road-specific ontology. At least some of the fuzzy rules in the set of fuzzy rules may include one of time or space fuzzy prepositions, where each of the fuzzy preposition may evaluate relative properties between two events or between an event and a context data item. At least one of the fuzzy prepositions may be customized to the events or the context data item.

In some embodiments, the road-specific ontology may include:
  domains, each representing a continuous property that is related to events;
  input values that are continuous variables that quantify the property represented by the domain;
  generics that are membership functions, each defined against a domain and maps an input value into a membership value for a domain;
  prepositions that are membership functions defined against a relationship between domains;
  terms, a categorial variable representing a property that is related to an input value; and/or
  term membership functions that map first term value into a second term value or provide a confidence level.

According to some embodiments, at least one of the fuzzy rules in the set of rules may be of the form IF A B C then D is E where: A is a first event, B is a fuzzy preposition, C is a second event or a context data item, where validating and matching may include evaluating A B C into a truth value and applying the truth value to D is E, where D is an outcome event and E is a generic that describes a domain in D.

In operation 480, the processor may provide the at least one consolidated event to a machine learning natural language model that may produce a narrative of the at least one consolidated event. Natural language models may include statistical, probabilistic, deep learning or other algorithms and models that can process, analyze and generate natural language text. Natural language models may be trained on vast amounts of textual data. The natural language model used herein may include publicly available or propriety models, trained on general data or on specific data, e.g., on consolidated events 280 and related narratives. In operation 490, the processor may provide the narrative as well to the user.

Reference is made to FIG. 5, showing a high-level block diagram of an exemplary computing device according to some embodiments of the present invention. Computing device 700 may include a processor 705 that may be, for example, a central processing unit processor (CPU) or any other suitable multi-purpose or specific processors or controllers, a chip or any suitable computing or computational device, an operating system 715, a memory 120, executable code 725, a storage system 730, input devices 735 and output devices 740. Processor 705 (or one or more controllers or processors, possibly across multiple units or devices) may be configured to carry out methods described herein, and/or to execute or act as the various modules, units, etc. for example when executing code 725. More than one computing device 700 may be included in, and one or more computing devices 700 may be, or act as the components of, a system according to embodiments of the invention. Various components, computers, and modules of FIGS. 1 and 2, may include devices such as computing device 700, and one or more devices such as computing device 700 may carry out functions such as those described in FIG. 12. For example, traffic control server 130 may be implemented on or executed by a computing device 700.

Operating system 715 may be or may include any code segment (e.g., one similar to executable code 725) designed and/or configured to perform tasks involving coordination, scheduling, arbitration, controlling or otherwise managing operation of computing device 700, for example, scheduling execution of software programs or enabling software programs or other modules or units to communicate.

Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long term memory unit, or other suitable memory or storage units. Memory 720 may be or may include a plurality of, possibly different memory units. Memory 720 may be a computer or processor non-transitory readable medium, or a computer non-transitory storage medium, e.g., a RAM.

Executable code 725 may be any executable code, e.g., an application, a program, a process, task or script. Executable code 725 may be executed by processor 705 possibly under control of operating system 715. For example, executable code 725 may configure processor 705 to provide consolidated events in a traffic management control centre, and perform other methods as described herein. Although, for the sake of clarity, a single item of executable code 725 is shown in FIG. 5, a system according to some embodiments of the invention may include a plurality of executable code segments similar to executable code 725 that may be loaded into memory 720 and cause processor 705 to carry out methods described herein.

Storage system 730 may be or may include, for example, a hard disk drive, a CD-Recordable (CD-R) drive, a Blu-ray disk (BD), a universal serial bus (USB) device or other suitable removable and/or fixed storage unit. Data such as the measured velocities as well as other data required for performing embodiments of the invention, may be stored in storage system 730 and may be loaded from storage system 730 into memory 720 where it may be processed by processor 705. Some of the components shown in FIG. 5 may be omitted. For example, memory 720 may be a non-volatile memory having the storage capacity of storage system 730. Accordingly, although shown as a separate component, storage system 730 may be embedded or included in memory 720.

Input devices 735 may be or may include a mouse, a keyboard, a microphone, a touch screen or pad or any suitable input device. Any suitable number of input devices may be operatively connected to computing device 700 as shown by block 735. Output devices 740 may include one or more displays or monitors, speakers and/or any other suitable output devices. Any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a printer, a universal serial bus (USB) device or external hard drive may be included in input devices 735 and/or output devices 740.

In some embodiments, device 700 may include or may be, for example, a personal computer, a desktop computer, a laptop computer, a workstation, a server computer, a network device, a smartphone or any other suitable computing device. A system as described herein may include one or more devices such as computing device 700. Device 700 or parts thereof may be implemented in a remote location, e.g., in a 'cloud' computing system.

When discussed herein, "a" computer processor performing functions may mean one computer processor performing the functions or multiple computer processors or modules performing the functions: for example, a process as described herein may be performed by one or more processors, possibly in different locations.

In the description and claims of the present application, each of the verbs, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for providing consolidated events in a traffic management control centre, the method comprising:
   receiving, from a plurality of sensors, a plurality of raw traffic events, wherein each raw traffic event of the plurality of raw traffic events comprises a geographical location, timestamp and event type;
   validating each of the raw traffic events against a set of fuzzy rules that comprise fuzzy operators with a road-specific ontology;
   discarding the raw traffic events for which validation is not successful from further processing and leaving validated events;
   obtaining geographic data from a plurality of georeferenced dynamic map layers;
   matching each of the validated events with the georeferenced dynamic map layers using the geographical location, timestamp and event type, and enriching each of the validated events with the associated geographic data to generate enriched events;
   matching each of the enriched events against a plurality of stored events using the geographical location, timestamp and event type, to generate consolidated events; and displaying at least one of the consolidated events on a map on a display in a traffic management control centre, wherein the map is based on the georeferenced dynamic map layers.

2. The method of claim 1, wherein each raw event of the plurality of raw events is obtained from an event source, and wherein matching each of the enriched events against a plurality of stored events comprises:
   matching each of the enriched events against a plurality of stored events originated from the same event source and having the same event type to generate same-source-same-type fused events;
   matching each of the same-source-same-type fused events against a plurality of stored events originated from a plurality of other event sources and having the same event type to generate different-source-same-type fused events; and
   matching each of the different-source-same-type fused events against a plurality of stored events originated from the plurality of event sources and having a different event type to generate the consolidated events.

3. The method of claim 2, comprising:
   in each step of matching, associating a relevancy score to each of the validated events, enriched events, same-source-same-type fused events, different-source-same-type fused events and consolidated events, based on the matching; and
   providing the associated relevancy score together with the at least one of the consolidated events.

4. The method of claim 3, wherein providing the at least one of the consolidated events comprises providing the consolidated events with a relevancy score that exceeds a threshold.

5. The method of claim 2, wherein the event source is selected from the list consisting of: a road side camera, a connected vehicle, a navigation service, sensors of an intelligent transportation system (ITS), social media, weather reports and operators event, and wherein the georeferenced dynamic map layers are selected from a list consisting of: asset maps, weather maps, air temperature maps, wind speed maps, humidity maps, visibility maps, traffic maps, speed maps, flow maps, class maps, historical weekly speed maps, historical weekly flow maps, risk maps, collision maps and congestion maps.

6. The method of claim 1, wherein validating and matching is performed using at least one of a binary operator and a knowledge graph, with a road-specific ontology.

7. The method of claim 1, wherein matching is performed using a second set of fuzzy rules that comprise fuzzy operators with a road-specific ontology.

8. The method of claim 1, wherein the road-specific ontology comprises:
   domains, each representing a continuous property that is related to events;
   input values that are continuous variables that quantify the property represented by the domain;
   generics that are membership functions, each defined against a domain and maps an input value into a membership value for a domain; and
   prepositions that are membership functions defined against a relationship between domains.

9. The method of claim 8, wherein the road-specific ontology further comprises:
   terms, a categorial variable representing a property that is related to an input value; and
   term membership functions that map first term value into a second term value or provide a confidence level.

10. The method of claim 1, wherein at least some of the fuzzy rules in the set of fuzzy rules comprise one of time or space fuzzy prepositions.

11. The method of claim 10, wherein each of the fuzzy preposition evaluates relative properties between two events or between an event and a context data item.

12. The method of claim 10, wherein at least one of the fuzzy prepositions is customized to the events or the context data item.

13. The method of claim 1, wherein at least one of the fuzzy rules in the set of rules is of the form IF A B C then D is E where:
   A is a first event,
   B is a fuzzy preposition,
   C is a second event or a context data item,
   wherein validating and matching comprises evaluating A B C into a truth value and applying the truth value to D is E, where:
   D is an outcome event and E is a generic that describes a domain in D.

14. The method of claim 1, comprising:
   providing the at least one consolidated event to a machine learned natural language model to produce a narrative of the at least one consolidated event; and
   providing the narrative to a user.

15. A system for providing consolidated events in a traffic management control centre, the system comprising:
   a display;
   a memory; and
   a processor configured to:
      receive, from a plurality of sensors, a plurality of raw traffic events, wherein each raw traffic event of the plurality of raw traffic events comprises a geographical location, timestamp and event type;
      validate each of the raw events against a set of fuzzy rules that comprise fuzzy operators with a road-specific ontology;
      discard the raw traffic events for which validation is not successful from further processing and leaving validated events;
      obtain geographic data from a plurality of georeferenced map layers;
      match each of the validated events with the georeferenced map layers using the geographical location, timestamp and event type, and enrich each of the validated events with the associated geographic data to generate enriched events;
      match each of the enriched events against a plurality of stored events using the geographical location, timestamp and event type, to generate consolidated events; and
      display at least one of the consolidated event on a map on a display in a traffic management control centre, wherein the map is based on the georeferenced dynamic map layers.

16. The system of claim 15, wherein each raw event of the plurality of raw events is obtained from an event source, and wherein the processor is configured to match each of the enriched events against a plurality of stored events by:
   matching each of the enriched events against a plurality of stored events originated from the same event source and having the same event type to generate same-source-same-type fused events;
   matching each of the same-source-same-type fused events against a plurality of stored events originated from a plurality of other event sources and having the same event type to generate different-source-same-type fused events; and matching each of the different-source-same-type fused events against a plurality of stored events originated from the plurality of event sources and having a different event type to generate the consolidated events.

17. The system of claim 16, wherein the processor is configured to:
in each step of matching, associate a relevancy score to each of the validated events, enriched events, same-source-same-type fused events, different-source-same-type fused events and consolidated events, based on the matching; and
provide the associated relevancy score to the user together with the at least one of the consolidated events.

18. The system of claim 17, wherein the processor is configured to provide the at least one of the consolidated events by providing the consolidated events with a relevancy score that exceeds a threshold.

19. The system of claim 16, wherein the event source is selected from the list consisting of: a road side camera, a connected vehicle, a navigation service, sensors of an intelligent transportation system (ITS), social media, weather reports and operators event, and wherein the georeferenced map layers are selected from a list consisting of: asset maps, weather maps, air temperature maps, wind speed maps, humidity maps, visibility maps, traffic maps, speed maps, flow maps, class maps, historical weekly speed maps, historical weekly flow maps, risk maps, collision maps and congestion maps.

20. The system of claim 15, wherein the processor is configured to validate and matching using at least one of a binary operator and a knowledge graph, with a road-specific ontology.

21. The system of claim 15, wherein the processor is configured to validate using a second set of fuzzy rules that comprise fuzzy operators with a road-specific ontology.

22. The system of claim 15, wherein the road-specific ontology comprises:
domains, each representing a continuous property that is related to events;
input values that are continuous variables that quantify the property represented by the domain;
generics that are membership functions, each defined against a domain and maps an input value into a membership value for a domain; and
prepositions that are membership functions defined against a relationship between domains.

23. The system of claim 22, wherein the road-specific ontology further comprises:
terms, a categorial variable representing a property that is related to an input value; and
term membership functions that map first term value into a second term value or provide a confidence level.

24. The system of claim 15, wherein at least a portion of the fuzzy rules in the set of fuzzy rules comprise one of time or space fuzzy prepositions.

25. The system of claim 24, wherein each of the fuzzy preposition evaluates relative properties between two events or between an event and a context data item.

26. The system of claim 24, wherein at least one of the fuzzy prepositions is customized to the events or the context data item.

27. The system of claim 15, wherein at least one of the fuzzy rules in the set of rules is of the form IF A B C then D is E where:
A is a first event,
B is a fuzzy preposition,
C is a second event or a context data item,
wherein validating and matching comprises evaluating A B C into a truth value and applying the truth value to D is E, where:
D is an outcome event and E is a generic that describes a domain in D.

28. The system of claim 15, wherein the processor is configured to:
provide the at least one consolidated event to a machine learned natural language model to produce a narrative of the at least one consolidated event; and
provide the narrative to the user.

29. A method for providing consolidated events in a traffic management control centre, the method comprising:
receiving, from a plurality of sensors a plurality of raw traffic events, wherein each raw traffic event of the plurality of raw traffic events comprises a geographical location, timestamp and event type;
validating each of the raw traffic events against a set of rules;
discarding the raw events for which validation is not successful from further processing and leaving validated events;
obtaining geographic data from a plurality of georeferenced dynamic map layers;
matching each of the validated events with the georeferenced dynamic map layers using the geographical location, timestamp and event type, and enriching each of the validated events with the associated geographic data to generate enriched events;
matching each of the enriched events against a plurality of stored events originated from the same event source and having the same event type to generate same-source-same-type fused events;
matching each of the same-source-same-type fused events against a plurality of stored events originated from a plurality of other event sources and having the same event type to generate different-source-same-type fused events;
matching each of the different-source-same-type fused events against a plurality of stored events originated from the plurality of event sources and having a different event type to generate the consolidated events; and
displaying at least one of the consolidated events on a map on a display in a traffic management control centre, wherein the map is based on the georeferenced dynamic map layers.

* * * * *